March 17, 1931.  J. H. NUTTALL  1,797,154
FLASH LIGHT HOLDING DEVICE
Filed March 29, 1930
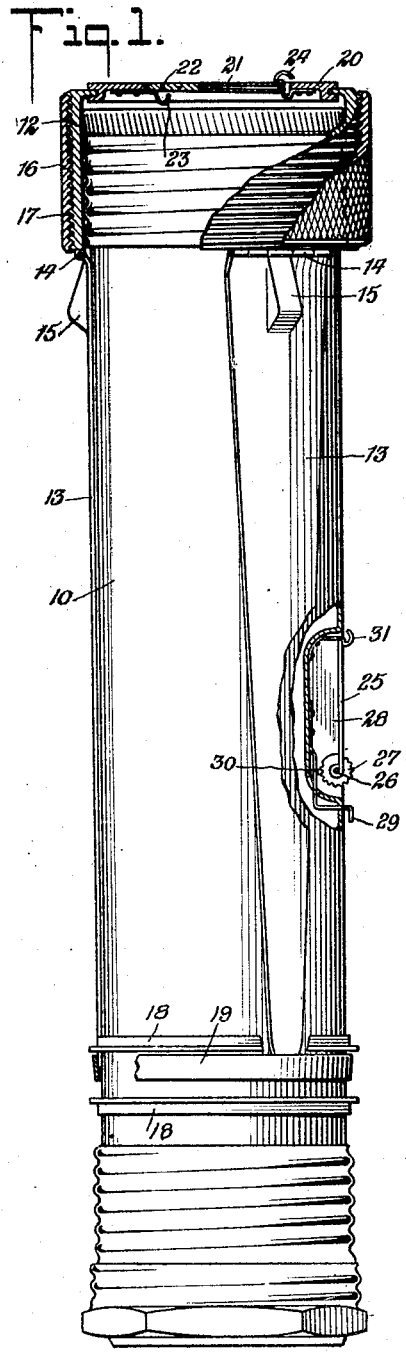
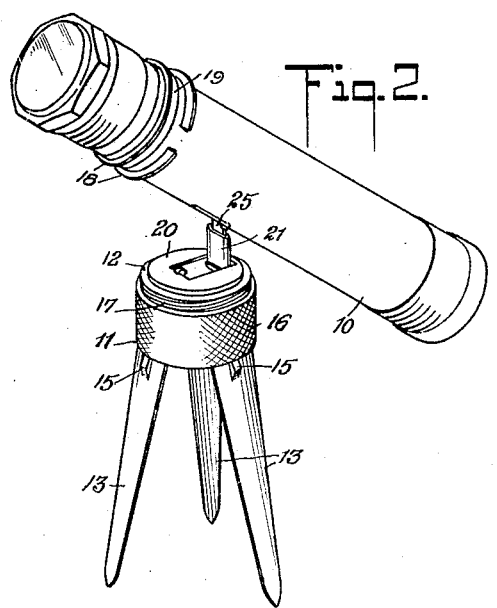
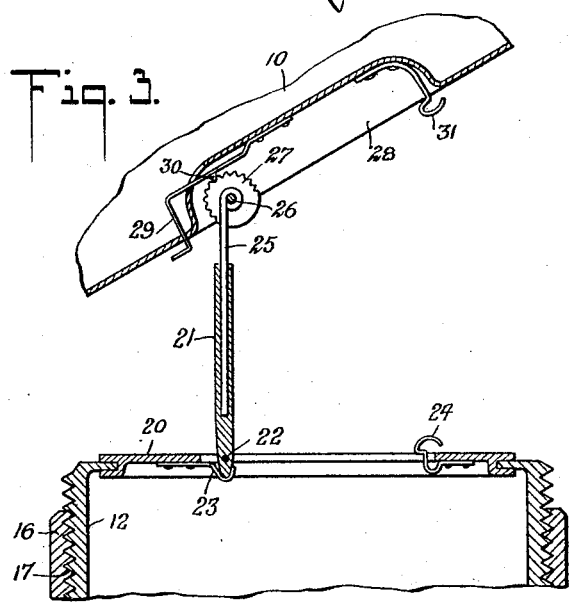
WITNESSES
INVENTOR
John H. Nuttall
BY
ATTORNEYS Patented Mar. 17, 1931

1,797,154

UNITED STATES PATENT OFFICE

JOHN H. NUTTALL, OF LAKE WORTH, FLORIDA

FLASH-LIGHT-HOLDING DEVICE

Application filed March 29, 1930. Serial No. 439,988.

This invention relates to devices designed and adapted to hold a flashlight or closely analogous article in different angular positions when it is desired to use the same for obvious purposes.

One of the objects of the invention is the provision of an improved form of stand which may be readily applied to a flashlight when not in use and which may also be readily detached therefrom to serve in conjuction with a part applied to the flashlight for the above mentioned purpose.

Another object of the invention is the provision of a device on a flashlight or closely analogous article which is designed and adapted to serve in conjunction with a support or stand for the above mentioned purpose.

With the foregoing and other objects in view the invention resides in the combinations, constructions, operations and functions of the parts hereinafter described and illustrated in the accompanying drawings, in which Figure 1 is a side view of a flashlight selected to illustrate the devices of the invention shown applied thereto, portions being shown in section and other portions being shown broken away;

Figure 2 is a perspective view showing the devices employed and holding the flashlight in one position for use;

Figure 3 is an enlarged sectional view showing certain features of the invention.

In the drawing there has been shown a flashlight of the conventional type, including an outer cylindrical casing 10. In accordance with the invention use is made of a stand 11. This stand 11, generally stated, comprises a base and a device mounted on the base for movement to different adjusted positions and adapted to detachably engage a part of the flashlight, for the purpose of holding the flashlight in different angular positions, when it is desired to use the flashlight for illumination purposes. The base of the stand 11 consists of a top ring member 12 and legs 13, each of which is connected with the ring member 12 for movement to different angular positions with respect thereto, and in the present instance each of said legs 13 is hingedly connected as at 14 with one circumferential edge of the ring member 12. Each of the legs 13 has a projection or lug 15 for a purpose to appear. A second ring member 16 is adjustable axially of the ring member 12, and this is accomplished by providing complemental threads on the ring members 12 and 16, as indicated at 17. It will now be apparent that the legs 13 may be brought to a relationship so as to closely embrace the casing 10 of the flashlight when the stand 11 is applied thereto, as shown in Figure 1. When the stand 11 is applied to the flashlight, the ring member 12 fits over one end of the casing 10. In order to hold the legs 13 against radial outward movement when the stand is applied to the flashlight, there are provided circular flanges or retaining rings 18 on the casing 10 and a slip ring 19 between the rings 18 which is engageable with the lower extremities of the legs 13 to hold the latter in place, as shown in Figure 1. When the stand 11 is detached from the flashlight, the ring member 16 may be adjusted on the ring member 12 so as to engage the projections or lugs 15 on the legs 13 to hold them against radial outward movement on their hinges 14, as shown in Figure 2. The stand 11 is thus set up for use.

In accordance with another feature of the invention, there is provided a disk 20 which is turnably mounted on the ring member 12 in any practical manner so as to be held by friction in different positions with respect to the ring member 12. The disk 20 has an opening therein in order to accommodate a member 21. The member 21 is pivotally connected at one end, as at 22, with the disk 20, and is thus movable into and out of an active position disposed perpendicular to the disk 20. The member 21 is held in the active position by a spring clip 23 attached to the disk 20, or by any other suitable means, and is held in the inactive position in the opening in the disk 20 by a spring clip 24 attached to the disk 20, or by any other suitable means. The member 21 is adapted to receive or engage a part applied to the flashlight to hold the latter in the desired adjusted position. In the present instance the member 21 is of split tubular form.

In accordance with another feature of the invention, there is provided a device applicable to the casing 10 of the flashlight which serves in conjunction with the member 21, to hold the flashlight at any desired angle with respect to the member 21. In the present instance this device includes a member 25 secured to a pivot 26 carried by the casing 10. This pivot 26 has secured thereto a toothed element or ratchet wheel 27. In the present instance the casing 10 has formed therein a recess 28. A spring pawl or latch 29 is attached to the casing 10 in the recess 28, and said latch 29 has a tooth 30 which is engageable with the teeth of the wheel 27, for the purpose of holding the member 25 in any desired angular position with respect to the casing 10. The pawl or latch 29 may be manipulated to disengage the tooth 30 so that the member 25 may be swung into the recess 28, and is held therein by re-engaging the tooth 30 with certain of the teeth of the wheel 27, as shown in Figure 1. If desired, an additional spring clip, such as the one indicated at 31, may be attached to the casing 10 to hold the free end of the member 25. The member 25 is adapted to be inserted into the tubular member 21, when the latter is in its active position in order to support the flashlight on the stand 11. It will be apparent that the latch 29 may then be manipulated to bring the flashlight to the desired angular position of adjustment.

From the foregoing it will be apparent that the stand 11 is one which is designed to be readily applied to the flashlight, to be carried with the flashlight when it is not in use; that the stand may be readily detached and be set up for use; that a device is arranged on the stand 11 which serves in conjunction with a device applied to the flashlight to detachably hold the flashlight in different angular positions.

It is to be understood that the invention is not restricted to the precise arrangement of parts shown and described, as details of construction may be modified and rearranged without departing from the spirit of the invention, the scope of which is limited only by the terms of the appended claims.

Claims:

1. A stand including a base comprising a top ring member, a turnable member on said ring member, article engaging means on said turnable member, legs hingedly connected with said ring member, and a second ring member adjustable axially on the top ring member and engageable with said legs to hold them against radial outward movement on their hinges to enable the use of the stand.

2. A flashlight stand including a base comprising a top ring member, legs hingedly connected with said ring member, a second ring member adjustable axially on the top ring member and engageable with said legs to hold them against radial outward movement on their hinges to enable the use of the stand, a turnable disk on said top ring member, and a member mounted on said disk for movement to different adjusted positions and adapted to detachably engage a part of the flashlight, for the purpose of holding the flashlight in different angular positions.

3. The combination of a flashlight and a separate stand for the flashlight, said stand comprising a ring member and legs hingedly connected with said ring member, said ring member being of a size to fit on one end of the flashlight with said legs disposed longitudinally of the flashlight; and means on the flashlight to engage said legs when disposed in the manner mentioned, whereby the stand may be conveniently carried with the flashlight when not in use.

4. A stand engaging device for a flashlight or the like comprising a member mounted on the flashlight for movement to different positions of adjustment with respect to the flashlight, and means on the flashlight to releasably hold said member in the adjusted positions, said member being adapted to detachably engage a part of a stand, for the purpose of holding the flashlight in different angular positions with respect to the stand.

JOHN H. NUTTALL.